Feb. 2, 1960 R. SCHILLING ET AL 2,923,557
RIDE HEIGHT CONTROL SYSTEM
Filed Jan. 10, 1956 4 Sheets-Sheet 3

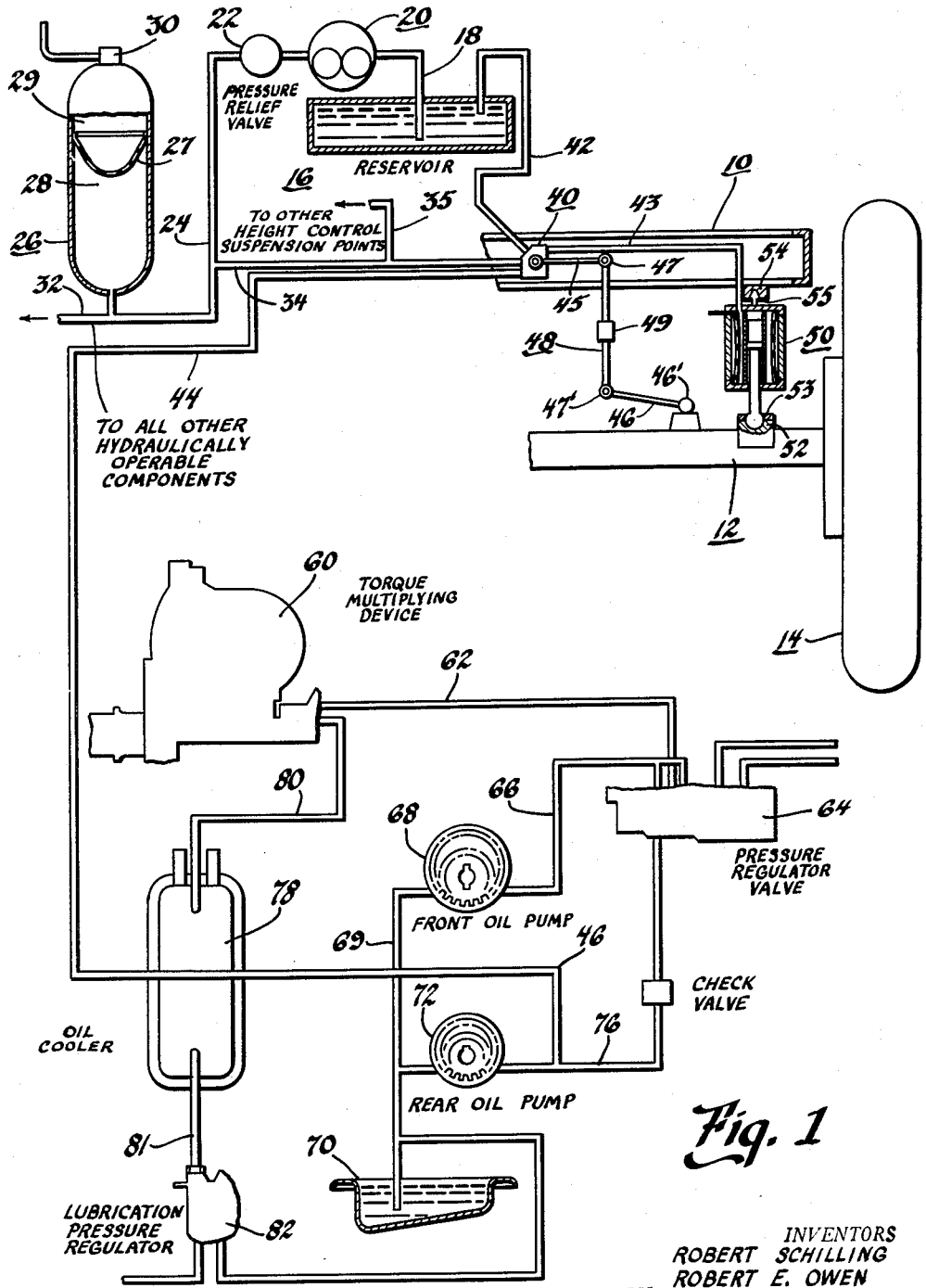

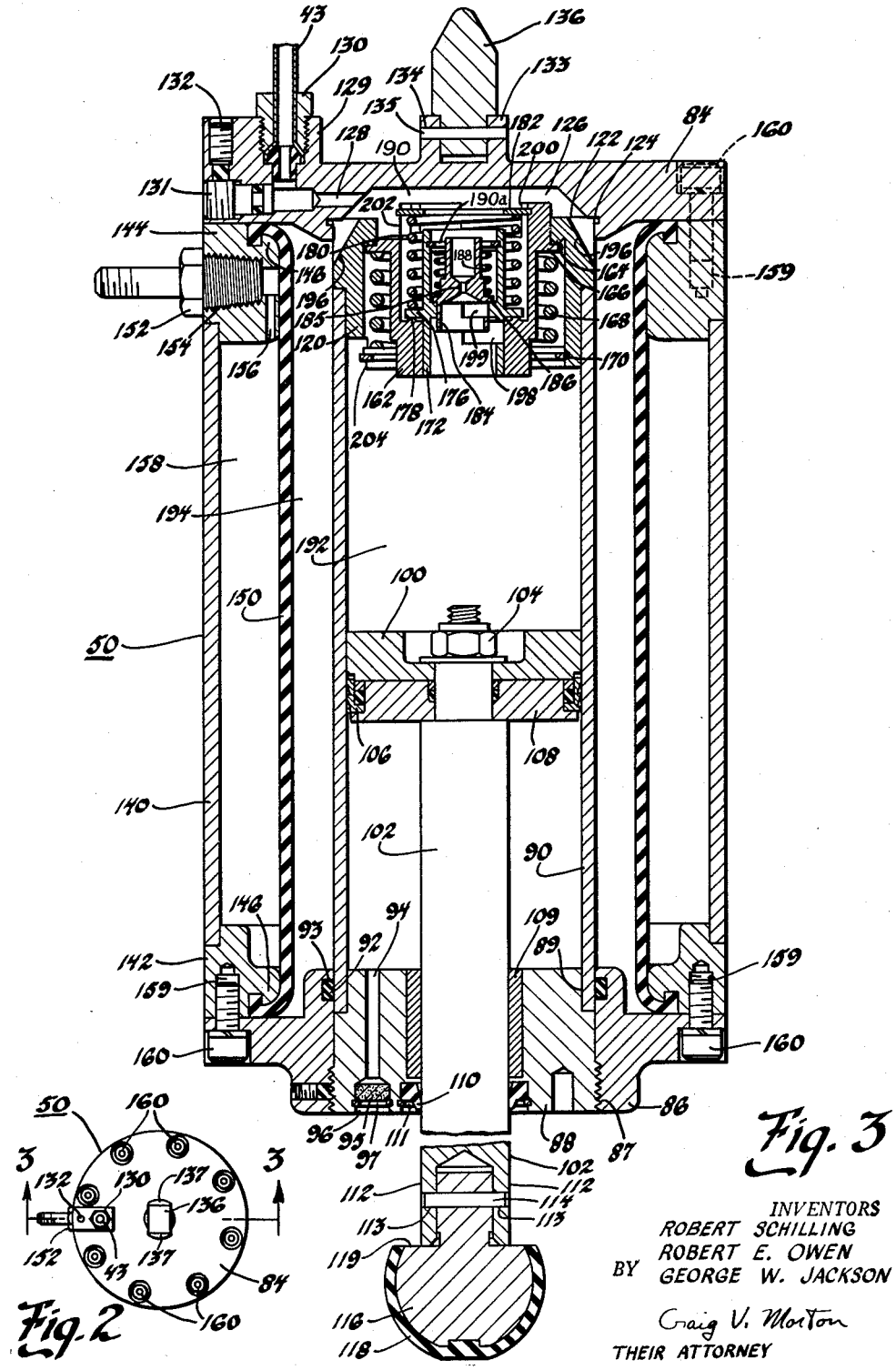

INVENTORS
ROBERT SCHILLING
ROBERT E. OWEN
GEORGE W. JACKSON
BY Craig V. Morton
THEIR ATTORNEY INVENTORS
ROBERT SCHILLING
ROBERT E. OWEN
GEORGE W. JACKSON
BY
Craig V. Morton
THEIR ATTORNEY

United States Patent Office 2,923,557
Patented Feb. 2, 1960

2,923,557

RIDE HEIGHT CONTROL SYSTEM

Robert Schilling, Bloomfield Hills, and Robert E. Owen, Detroit, Mich., and George W. Jackson, Dayton, Ohio, assignors to General Motors Corporation, Detroit, Mich., a corporation of Delaware Application January 10, 1956, Serial No. 558,310

1 Claim. (Cl. 280—124)

This invention relates to an air-oil suspension, and particularly to a ride height control system operable by interchanging hydraulic fluid from a single source supplying all hydraulically operable vehicle components.

Previous suspension systems have provided control means responsive to a change in clearance height between a frame or vehicle body and running gear, axle, or lower control arm, to establish a predetermined support that avoids body "bottoming" thereon with vehicle loading. The present invention is an improvement over such apparatus having a control mechanism which provides for interchange of hydraulic fluid with a cylinder for resilient support between a body and axle. With increasing use of hydraulically operable vehicle components and hydraulic power-operated units, it is advantageous to provide a suspension system tied in with a single source supplying all hydraulically operable vehicle components. It is desirable that such a system be rendered ineffective during vehicle advancement movement to prevent suspension height changes in predetermined height clearance due to road travel vibrations between a body and its running gear. During this movement and system ineffectiveness, air pockets or chambers cooperating with hydraulic chambers can provide resilient means for supporting the body of a vehicle on its running gear, lower control arms or axles.

An object of the present invention is to provide an oil-air type suspension controlled by a load-responsive valve regulating interchange of hydraulic fluid to a height control suspension device tied in with a single source supplying all hydraulically operable components of a motor vehicle.

Another object is to provide a ride height control system combined with a pump, reservoir and accumulator including a height control valve rendered ineffective during vehicle movement responsive to a hydraulic connection with a hydrokinetic torque transfer device or automatic transmission.

Another object is to provide a suspension cylinder providing a sealed outer chamber and an inner chamber concentrically valved to communicate with a primary source of hydraulic power on a motor vehicle supplying other hydraulically operated components.

The aforementioned and other objects are accomplished in the present invention in a system operable by hydraulic fluid from a primary source of hydraulic power on a motor vehicle for all hydraulically operated components. The primary source includes a pump and reservoir connected to an accumulator for maintaining hydraulic or oil pressure at a volumetric capacity sufficient to operate all components simultaneously.

A ride height control valve is connected with the accumulator and pump through a suitable conduit. This valve is mounted on the vehicle body and is provided with a spindle rotatable by a linkage operably connected to the vehicle running gear or axle to move in response to difference in height between the axle and frame upon static load variation of the vehicle. The spindle carries a cam member capable of opening an "up" and a "down" valve to regulate hydraulic fluid flow to and from a support cylinder journalled between the vehicle axle and body to act as a jack in raising and lowering the height differential therebetween. The cam member is axially movable to an inoperative position with respect to height responsive rotation of the spindle. This axial movement is effected by fluid actuation through a port connected to a pump in a hydrokinetic torque transfer mechanism or automatic transmission, such as the well known "Dynaflow" or comparable devices, for example, when vehicle movement begins so as to eliminate variations in height control due to momentary vibrations under kinetic conditions.

The support cylinder is provided with a sealed or closed chamber formed between an outer housing and a tubular expansible wall adapted to receive and hold a gaseous fluid medium, such as air. A pair of valves concentrically disposed in an inner cylinder regulate flow for extending or retracting a piston reciprocal in the inner cylinder to vary height between the body and axle. One of these support cylinders may be located with each axle or each wheel. A chamber is formed between the inner cylinder and the diaphragms or flexible wall with one of the concentric valves opening as the other closes upon displacement of hydraulic fluid above the piston during vehicle movement. If road shock moves the piston upwardly, hydraulic fluid passes through one of the valves to the chamber between the inner cylinder and diaphragm so as to further compress the pressurized gas in the chamber between the diaphragm and outer housing in direct proportion to the support required under the shock condition. Similarly, if the piston and axle move downwardly, the other concentric valve opens and hydraulic fluid is pushed back into the cylinder above the piston under influence of re-expansion of the gaseous fluid medium. Springs biasing the concentric valves regulate the pressure at which the fluid will pass the valves to obtain the desired shock absorbing reciprocation of the piston in the cylinder due to axle vibratory movements while the vehicle is in motion.

Further objects and advantages of the present invention will be apparent from the following description, reference being had to the accompanying drawings wherein preferred embodiments of the present invention are clearly shown.

In the drawings:

Figure 1 is a schematic illustration of an air-oil suspension incorporating the cylinder support or control cylinder, height control valve, pump, reservoir, accumulator, and fluid source connection that is responsive to movement of a motor vehicle rendering the control mechanism inactive during vehicle movement.

Figure 2 shows an end view in reduced scale of an air-oil control cylinder assembly used in the present system.

Figure 3 is a cross-sectional view of the cylinder assembly taken along line 3—3 of Figure 2.

Figure 6:
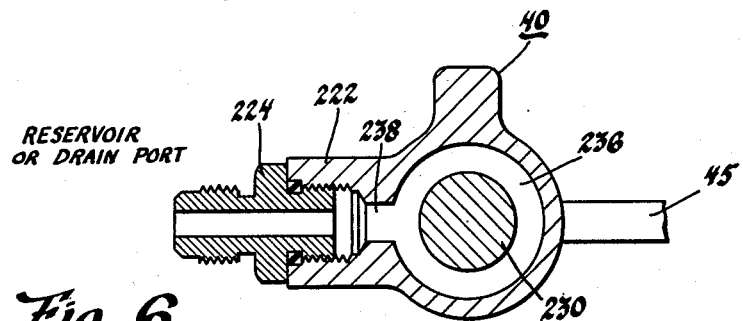
Figure 6 is a cross-sectioned elevational view of the valve taken along line 6—6 of Figure 4 showing the reservoir or drain port in the valve.

With particular reference to Figure 1, the schematic illustration of the air-oil suspension of the present invention is shown with a body, or vehicle chassis, indicated generally by the numeral 10 and a running gear, axle, or suspension lower control arm 12, having a wheel 14 rotatably journalled thereon. The suspension system includes a reservoir 16 for hydraulic fluid with a conduit 18 leading therefrom to a hydraulic pressure pump 20 in series with a pressure relief valve 22 connected by a conduit 24 to a hydraulic, or oil pressure, accumulator, 26. The hydraulic pressure accumulator includes a diaphragm 27 disposed between the hydraulic chamber 28 of the accumulator and the air chamber 29 with a conventional valve 30 provided to supply air pressure to the air chamber 29 of the accumulator. The size and capacity of the accumulator in the present invention is sufficient to supply all hydraulically operable components which may be installed on the motor vehicle and a conduit 32 is shown to represent a connection with all the other hydraulically operable components. The conduit 34 is connected with conduit 24 to receive pressurized hydraulic fluid forced by the pump 20 to the accumulator 26 to provide a fluid connection to a height control valve indicated generally by the numeral 40, which is shown in greater detail in other drawings as explained below. A conduit 35 represents a connection with conduit 34 to other height control suspension units. The height control valve 40 is connected through a drain conduit 42 to provide a return path to the hydraulic fluid reservoir 16. Another conduit 43 connects the valve 40 to a hydraulic fluid chamber of a cylinder support, height control cylinder, suspension unit or device generally indicated by the numeral 50, disposed between the chassis, or frame, 10, and the running gear or axle 12 by means of a ball and socket mounting 52 disposed on the axle and a socket, or pivot mounting, 54, on the frame. Plates 53 and 55, respectively, are provided with the sockets 52 and 54 to retain the socket portions of the control cylinder 50 in an attached relationship to the body and axle with further details to be explained below.

The height control valve 40 is also connected by a conduit 44 with an automatic transmission including a hydrokinetic torque transfer mechanism or torque multiplying device 60 connected through a conduit 62 to a pressure regulator valve 64. The pressure regulator valve is connected by a conduit 66 to a front oil pump 68 driven concurrently with an engine shaft (not shown) which, in turn, provides fluid flow through conduit 69 from a sump 70 to conduit 66 and valve 64. Some of the oil is circulated through the conduit 62 through hydrokinetic torque transfer mechanism 60. A rear oil pump 72, driven only when a propeller shaft (not shown) rotates, provides fluid flow through conduit 76 to the pressure regulator valve when the vehicle is in motion. The conduit 44 connected to the height control valve 40 communicates through a suitable connection with the conduit 76 to channel pressurized fluid from the rear oil pump to the height control valve 40 for a purpose to be explained below. The automatic transmission is provided with an oil cooling means including an oil cooler 78 connected by a conduit 80 with the torque multiplying device 60 to cool the oil used in the torque converter. A conduit 81 connects the oil cooler 78 to a lubrication pressure regulator 82 as shown by the schematic illustration of Figure 1.

Figure 1 also shows a connecting means or linkage generally indicated by the numeral 48 adjustably connected by a member 49 between a spindle arm 45 of valve 40 and rod 46 rigidly fixed to the running gear 12 as at 46' by pivots 47 and 47', respectively. This linkage acting on spindle arm 45 of height control valve 40 between the chassis 10 and axle 12 provides movement responsive to the difference in height between the vehicle body and axle so as to actuate control ports of the height control valve 40 in a manner to be explained in further detail below.

Figure 2 shows an end view looking at the top of the height control cylinder or suspension unit generally indicated by the numeral 50 in the present suspension system. Figure 2 is drawn one-third the scale shown in Figure 3 for purposes of illustrating convenience. Figure 3 represents a cross-sectional view of the cylinder assembly taken along line 3—3 of Figure 2. The height control cylinder, as shown in Figure 3, includes a valve end assembly or member 84 and a screw cap assembly 86 at opposite ends. The screw cap 86 is provided with a central aperture threaded at one end with threads 87 to receive an assembly cap 88 which is suitably recessed at its outer periphery on the end opposite the screw threads by an annular groove 89 to receive an inner or tube cylinder or sleeve 90. An O-ring seal 92 is disposed in an annular recess 93 of screw cap 86 to provide a seal between the screw cap 86 and cylinder 90. The cap assembly 88 is provided with a vent aperture 94 disposed with a porous metal breather valve 95 retained in a bore 96 in communication with the aperture 94 by means of a retaining ring 97. The cylinder 90 has reciprocally disposed therein a piston 100 having a piston rod 102 suitably attached thereto by means of a nut and bolt connection 104 as shown. A sealing means 106 is retained with the piston 100 by means of a spacing retainer 108 assembled between the piston rod 102 and piston 100 to provide a fluid seal between the piston and cylinder 90. A bushing 109 is provided as a plain bearing surface between the piston rod 102 and a central aperture of cap assembly 88 with a sealing means 110 retained by a ring 111 providing a fluid seal between the cap assembly 88 and rod 102. The piston rod 102 extends through the bushing and end cap assembly to a bifurcated portion 112 which is apertured at 113 to receive a pin 114 rigidly attaching the rod to a ball socket 116. The ball socket is adapted to be resiliently connected to the axle by resilient means, such as reinforced plastic or rubber, 118, disposed between the ball socket 116 and the cooperating socket 52 disposed on the axle 12 as shown in Figure 1. The apertured plate 53, noted in Figure 1, provides a flat retaining means cooperating with a truncated surface 119 on the ball socket 116 to retain the piston rod in assembled relationship with the axle to prevent the ball and socket from separating in the assembly as described.

The tube cylinder 90 in which the piston 100 is reciprocally disposed is retained in the recess 89 of cap assembly 88 at one end and at its opposite end is fitted into an annular recess of a valve cage 120. The valve cage 120 is provided with an annular seat 122 that engages the valve end assembly or member 84, on a shoulder 124, leaving a recess 126 axially in line with the interior of the tube cylinder 90. This recess communicates with a passage 128 which, in turn, is connected to a fluid port 129 suitably threaded to receive a fitting 130 in sealing engagement with conduit 43. Conduit 43 connects the height control cylinder 50 with the height control valve 40 as outlined in the explanation of the subject system in Figure 1. Set screws 131 and 132 are provided to lock and seal the bores required to form passage 128 in the cap 84. The valve end assembly 84 is provided with an upwardly extending bifurcated portion 133 suitably apertured at 134 to receive a pin 135 for retaining a knife edge support 136 cooperable with the socket 54 attached to frame, or body member, 10, as illustrated in Figure 1. The knife edge support 136 is provided with a cone-shaped structure as indicated in Figures 1 and 2 with the overhanging portions 137 on diametrically opposite sides thereof cooperating with the retaining plate 55 of Figure 1. This keeps the knife edge support 136 in assembled relationship with the socket 54 permitting linear pivoted movement along a line represented by the diameter of section line 3—3 of Figure 2.

Located concentrically with the tube cylinder 90 between the opposite end assemblies 84 and 86—88 is an outside chamber assembly including an outer cylindrical member 140 welded at opposite ends or otherwise suitably attached to annular member 142 and annular port member 144. Each of the members 142 and 144 is provided with a hook structure 146 adapted to receive bent-over end portions of a diaphragm 150 formed of flexible material such as rubber. The diaphragm 150 together with the outer cylindrical member 140 forms an outer chamber around the entire periphery of the control cylinder. This chamber is filled with gas under pressure, such as air, which may be supplied through a valve 152 threaded into engagement as at 154 with the annular port member 144. This may be a conventional Schrader valve which communicates through a passage 156 with an outside chamber 158 formed between the diaphragm and outer cylindrical member as described. The annular members 142 and 144 are also provided with a plurality of threaded bores 159 with a plurality of screws 160 fastening the opposite end assemblies 84 and 86—88 to the outside chamber assembly 140—142—144. This assembly locks the cylinder 90 and valve cage 120 into place between the opposite end assemblies also. Figure 2 shows the top view of the cap assembly 84 attached by bolts 160 to the remainder of the control cylinder with the valve 152 and port 130 disposed therewith.

Figure 3 also shows a concentric or dual valve assembly located in the control cylinder 50 within the valve cage 120. This assembly includes a rebound control valve 162 which opens to admit hydraulic fluid to space above the piston 100 when suspension height is being increased or to permit hydraulic fluid to be pushed by expansion of the gaseous fluid medium from space between diaphragm 150 and inner cylinder 90 to space inside cylinder 90 and above piston 100 if the latter is suddenly moved to a further extended position in response to axle vibratory movements while the vehicle is travelling over a road. Valve 162 is seated on an annular cone-shaped shoulder 164 by means of an annular flange 166 on the rebound control valve 162. The rebound control valve 162 is normally biased into engagement with the cone-shaped shoulder, or seat, 164, by means of a coil spring 168 compressed between the annular flange 166 and a snap ring 170 fitted into an internal groove of the valve cage 120. Located concentrically within the rebound control valve 162 is a valve stem 172 having an outwardly extending annular flange 176 engageable with a valve seat 178 formed on an annular shoulder portion of rebound control valve 162. The valve stem 172 is unseated in response to decrease of suspension height between the body and its running gear and in absorption of road shocks causing piston 100 to move to a further retracted position pushing fluid from space above the piston inside cylinder 90 to space between diaphragm 150 and inner cylinder 90. Thus, the action and purpose of valve stem 172 is the reverse of that of rebound control valve 162 described above. The valve stem 172 is normally biased into engagement with the seat 178 by a concentrically located coil spring 180 fitted between the outwardly extending annular shoulder 176 of valve stem 172 and a snap ring 182 fitted into an internal groove of rebound control valve 162. Located concentrically within the valve stem 172 is a fine adjustment valve stem or damper valve 184 with a central bleed or damper aperture 185 seated at 186 on an inwardly extending radial flange of the valve stem 172 with a spring 188 fitted between a flange portion of the damper valve 184 and a snap ring 190a fitted into an annular groove. The operation and movement of damper valve 184 is similar to that of valve stem 172.

The concentrically located valve members 162, 172 and 184 provide communication between the conduit 43 and passage 128 from one side of an inlet chamber 190 formed with recess 126 of member 84 to the piston chamber 192 and vice versa. The inlet chamber 190 also communicates with an inner hydraulic chamber 194 by means of cutout or chamfered portions 196 in the valve cage 120.

In operation, when fluid is supplied under pressure through conduit 43 to raise the body with respect to the running gear or axle in the present system, to thereby extend the control cylinder 50 by supplying additional hydraulic fluid into the piston chamber 192, the rebound control valve 162 is pushed, or forced downwardly, free of the seat 164 so that fluid passes between the valve cage 120 and rebound valve stem 162 around the compression spring 168 into the piston chamber 192. In raising the cylinder 50, fluid will also be supplied to the inner chamber 194 located about the annular peripheral space between the diaphragm 150 and cylinder 90.

To decrease the height between the body 10 and axle 12, oil in the piston chamber 192 must be decreased so that fluid passes through radial slots, or apertures, 198 and 199, located in valve stem 172 and damper valve 184 shown in Figure 3. Flow of fluid through these slots forces either or both of these valve members off of seats 178 and 186, respectively, to permit fluid flow around the coil-spring-occupied space between each of these valve members. To facilitate flow of fluid between the inlet chamber 190 and the space occupied by the spring 180, the rebound control valve is slotted as at 200 and 202. The valve cage 120 is slotted as at 204 for a similar purpose.

In addition to permitting flow in and out of the piston chamber 192 during raising and lowering of the control cylinder 50, the concentric or dual valve means provide a shock absorber or damper valving effect when the suspension system is rendered inoperative by vehicle movement due to the fluid connection with the automatic transmission as outlined in Figure 1. The height control valve 40 is prevented from permitting change of the amount of hydraulic fluid in the control cylinder 50 during vehicle movement and any shocks, vibrations, or variations in height between the axle and chassis are absorbed by the control cylinder 50 due to fluid flow between the piston chamber 192 and inner concentric chamber 194 between the diaphragm 150 and cylinder 90. Valving operation then is similar to that described above for increase and decrease of hydraulic fluid in the control cylinder 50. When the axle and chassis are separated from normal height relationship during sudden temporary road shocks, such as when piston 100 drops with the axle to a further extended position, the air under pressure in the outer chamber 158 expands and presses the fluid in the inner chamber 194 through the concentric valve means, specifically rebound valve 162, into the piston chamber 192 filling a void created therein. When the axle is forced upwardly due to sudden changes in height relative to the chassis, the hydraulic fluid is forced into the inner concentric chamber 194 and acts upon the diaphragm 150 to further compress the air in the outer concentric chamber 158. The degree of response and softness of the ride attained in this shock absorber action is adjustable by selection of valve springs 168, 180 and 188 and by varying the air pressure through valve 152 permitting admission or escape of the amount of air trapped under pressure in the chamber 158.

Figure 4:
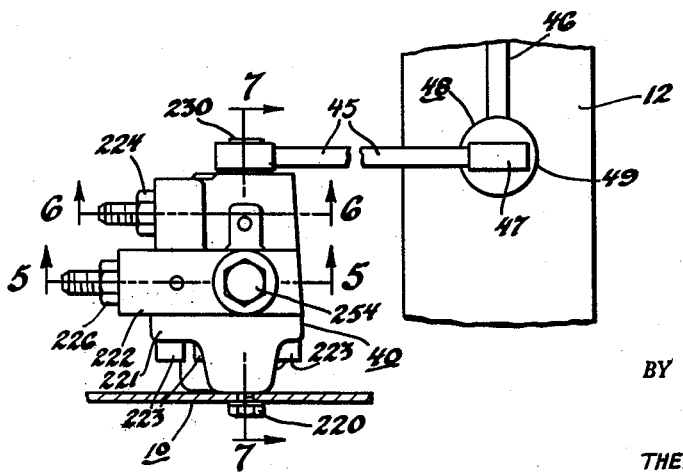
Figure 4 is a plan view of the trim height control valve used in the present system.
Figure 7:
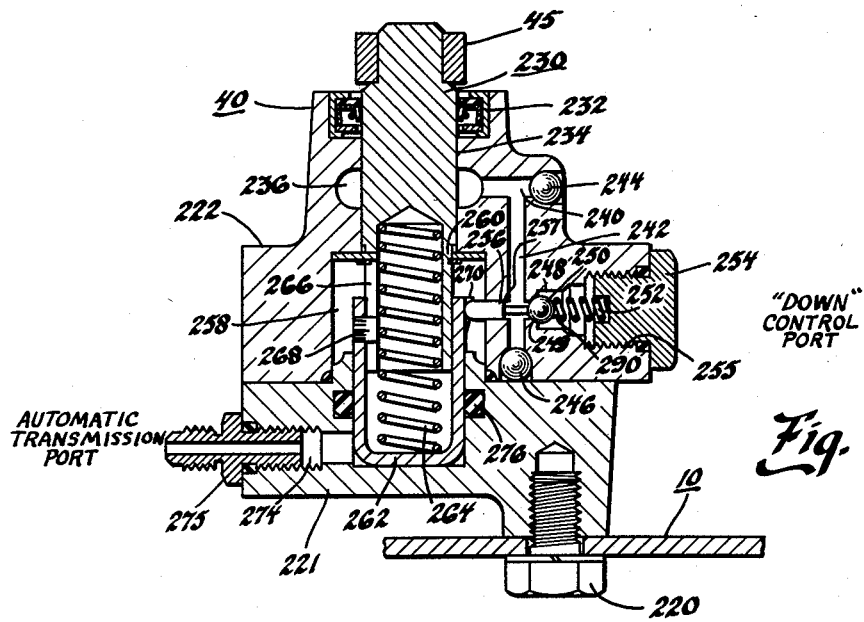
Figure 7 is a cross-sectional elevational view of the valve taken along line 7—7 of Figure 4 showing the "down" control port, camming member, automatic transmission fluid port, and other conduits in the valve.

The height control valve 40, mentioned in the description for the system generally and in conjunction with controlling raising and lowering of the control cylinder 50, is shown in a plan view in Figure 4 together with a top view of the linkage 48 between the control valve 40 and axle 12. The height control valve 40 is shown in Figures 4 and 7 attached to the body, or chassis, 10, by bolts 220 threaded to a housing mounting member or cap 221. A housing 222 attached by screws 223 to cap 221 is provided with a reservoir or drain port 224 and cylinder port 226. Port 224 is connected through conduit 42 to the reservoir 16. The cylinder port 226 is connected through conduit 43 to the control cylinder 50.

Figure 5:
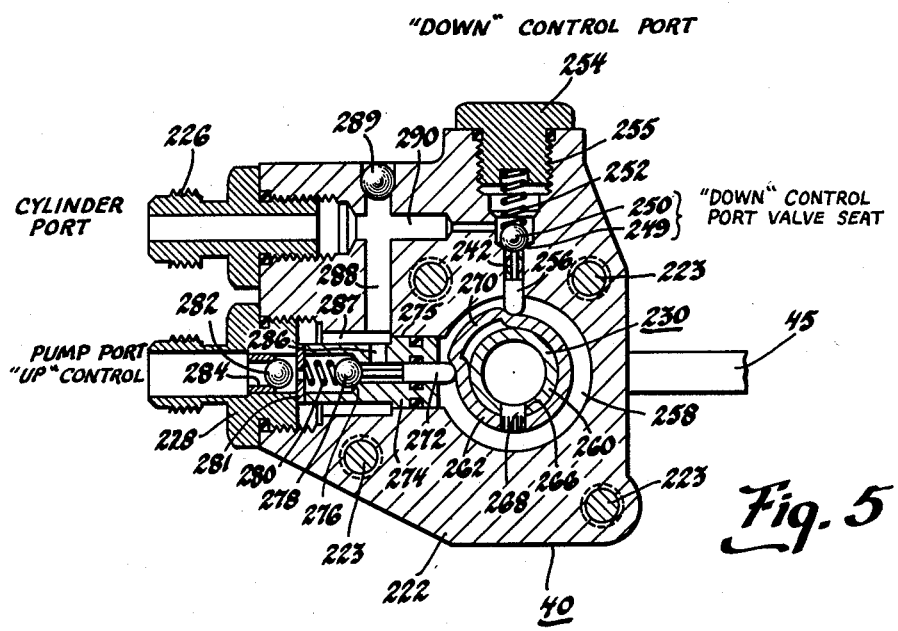
Figure 5 is a cross-sectional elevational view of the valve taken along line 5—5 of Figure 4 showing a cylinder port, "up" control port, and "down" control port.

Figure 5 is a cross-sectioned elevational view of the height control valve 40 taken along line 5—5 of Figure 4. The housing 222 is shown with passages and ports, one of which is the cylinder port 226 provided by a suitable fitting threaded into sealing engagement with the housing at one side thereof. A pump port or "up" control port is shown located in elevational alignment with the cylinder port 226 by a fitting 228 threaded into sealing engagement with another portion of the housing 222. The fitting 228 is connected to conduit 34 in the system as shown in Figure 1. Figure 5 also shows a transverse spindle 230 which is rotatably journalled in the housing movable with a spindle arm 45 attached thereto and connected with the linkage generally indicated by the numeral 48 between the axle and chassis mounted height control valve 40.

Figure 6 is a cross-sectional elevational view of the valve 40 taken along line 6—6 of Figure 4 showing the reservoir port 224 fitted into threaded engagement with the housing 222. The reservoir port is connected to passages to be explained in further detail below.

Figure 7 is a cross-sectioned elevational view of the valve taken along line 7—7 of Figure 4 showing the housing 222 and the complementary mounting member 221 with the spindle 230 rotatably journalled in the housing 222. The spindle arm 45 is press-fitted or otherwise attached to the spindle 230 and a sealing means 232 is provided to prevent escape of fluid along the bearing surface between the housing 222 and spindle 230. The housing is provided with a central bore 234 formed with an annular chamber 236 the purpose of which is to provide communicating flow with the reservoir port 224 seen in the cross-sectional view of Figure 6. A passage 238 connects the reservoir port 224 with the annular chamber 226 as shown in Figure 6. A passage 240, shown in Figure 7, communicates with the chamber 236 at one end and at the other end connects to a passage 242 parallel to the central bore providing the bearing surface for the spindle 230. Balls 244 and 246 are press-fitted into the open ends of passages 240 and 242, respectively, so as to seal off the openings necessarily made during drilling of the passages. The passage 242 communicates with a "down" control port passage 248 formed with an annular seat 249 engaged by a ball 250 normally biased to seat on the annular portion 249 by a spring 252 disposed between the ball 250 and a sealing cap 254 threaded into sealing engagement with the housing 222 along threads 255. The ball 250 can be moved from the seat 249 by means of a rod and plunger 256 reciprocable in an extension of the bore of port 248 in an aperture 257 of the housing. This aperture 257 permits the plunger 256 to reciprocate in a centrally located chamber 258 concentric and coaxial with the central aperture 235 of the housing. The spindle 230 has a hollow cylindrical portion 260 extending into this chamber with a hollow cup-shaped member 262 cooperable therewith concentrically disposed about the outer periphery of the cylindrical portion 260. A compression spring 264 is disposed inside the hollow cylindrical portion 260 of the spindle 230 biasing the cup-shaped member 262 out of engagement with the spindle. A keyway 266 provides a cooperating path for a dowel or pin member 268 press-fitted into the cup-shaped member 262 so as to cause the spindle 230 to rotate the cup-shaped member 262 while permitting relative axial movement between the cup-shaped member 262 and spindle 230. The cup-shaped member 230 is provided with a cam surface 270 cooperable with the plunger 256 for the "down" control port ball valve 250 as shown in Figure 7. Figure 5 shows the cross-sectional view of the cam portion 270 of the cup-shaped member 262 cooperable with the plunger 256.

A plunger 272 similar to plunger 256 is provided at right angles to the cup-shaped member 262 and plunger 256 as shown in Figure 5. The plunger 272 is reciprocally journalled in a centrally apertured valve member 274 in sealing engagement with a hole 275 in the housing 222. The member 274 provides a seat 276 for a ball valve member 278 biased into engagement with the seat 276 by a spring 280 seated between the ball 278 and a centrally apertured disc 281, tightly clamped between member 274 and the fitting 228. The ball 278 acts as the control for raising the chassis 10 with respect to the axle 12 and is, therefore, the "up" valve for the height control cylinder 50. The height control is dependent upon rotational movement imparted to the spindle 230 through linkage 48 and spindle arm 45 responsive to the relative height between the chassis and axle. The cam surface 270 is engageable with plungers 256 and 272 when the vehicle is at a standstill position. However, as shown in Figure 7, the housing 222 is attached by screws 223, shown in the cross-sectional view of Figure 5 and in Figure 4, to the mounting member 221 which provides a port 274 with fitting 275 threaded into sealing engagement therewith for a fluid connection through conduit 44 as shown in Figure 1 to a hydrokinetic torque transfer mechanism or torque converter automatic transmission. This fluid connection becomes operative when the vehicle is moved so that the rear oil pump 72 of the automatic transmission provides fluid pressure to the port 274 sufficient to overcome the biasing of spring 264 such that the cup-shaped member 262 is moved axially over the cylindrical portion 260 of the plunger or spindle 230 causing the cam portion 270 of member 262 to be axially moved free of possible actuating engagement with the plungers 256 and 272 for the "down" and "up" valves, respectively. An O-ring seal 276 is provided in an annular groove of mounting member 230 to provide a fluid seal between the cup-shaped member 262 and the mounting member 223. As long as the vehicle is moving, fluid pressure will be supplied from the rear oil pump 72 through conduit 44 to keep member 262 in telescoped relationship with the cylindrical portion 260 of spindle 230 rendering the "up" and "down" control valves totally inoperative for any variation of height by the height control cylinder 50.

Figure 8:
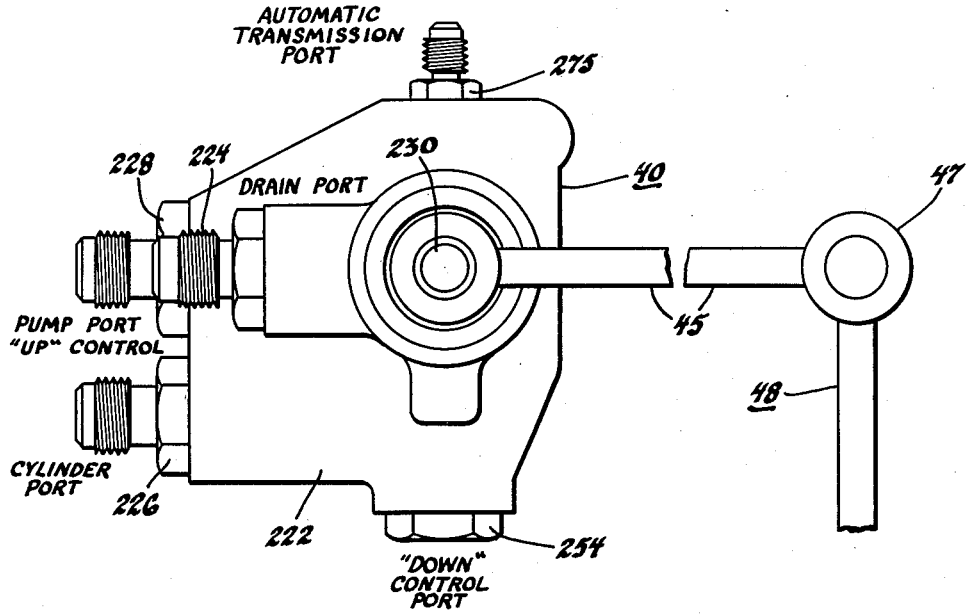
Figure 8 is an elevational view of the valve showing linkage between the frame-mounted valve and vehicle axle for actuating the "up" and "down" control ports before the vehicle moves.

Figure 8 is an elevational view of the valve 40 showing how the linkage 48 is attached to the spindle arm 45 and spindle 230 by pivot 47 for rotation therewith together with a showing of the relationship of the various ports provided in the valve 40. These ports include the transmission connection fitting 275, the "up" control port 228, the cylinder port 226 and the reservoir or drain port 224.

In operation, the valve permits hydraulic fluid to be supplied from the pump 20 and accumulator 26 through conduit 34 through the "up" pump port 228 with a check valve ball 282 off of its seat on bushing 284 press-fitted in the port fitting permitting fluid to flow through the centrally apertured disc 281 and the central aperture of member 274 to a radial aperture 286 thereof communicating with an annular bore 287 of port 228 and a conduit 288 to the cylinder port 226 and then through conduit 43 to the height control cylinder 50. The opening formed by drilling the conduit 288 in housing 222 is sealed by a ball 289 press-fitted therein. When the valve is in operation at standstill and the height differential between the body and its running gear is to be decreased, the cam 270 will engage the plunger 256 causing the ball 250 to move from its seat 249 such that fluid can flow from the cylinder 50 through conduit 43 and cylinder port 226 through an aperture 290 (seen in longitudinal cross section in Figure 5 and partially behind ball 250 of Figure 7) to conduit 242, seen as a circular opening behind the plunger 256 in Figure 5 and in longitudinal cross section in Figure 7, to flow through an aperture 240 back into an annular chamber 236 as shown in Figure 7 and finally to leave the height control valve 40 by means of passage 238 and port 224 shown in the cross-sectional view of Figure 6. The port 224 connects with the conduit 42 communicating with the reservoir 16.

While the embodiments of the present invention as herein disclosed constitute a preferred form, it is to be understood that other forms might be adopted.

What is claimed is as follows:

In a motor vehicle suspension system, the combination including, a vehicle body, running gear for said body, a liquid receiving height control cylinder attached between said running gear and said body including a first chamber for receiving liquid under pressure to change the internal pressure in the cylinder to compensate for load change in the vehicle and a second chamber containing gas under pressure with a common flexible wall between said chambers whereby said gas under pressure supports the liquid under pressure and thereby supports said body relative to said running gear; a source of hydraulic fluid power on said vehicle including a pump, a reservoir for hydraulic fluid for said pump in fluid connection with the inlet of said pump, and a pressure accumulator in fluid connection with the outlet of said pump; a height control valve in fluid flow connection between said source and said cylinder and including a first plunger operated valve means to open and close inlet port means in fluid connection with said pressure accumulator and connected with other passage means in said control valve to provide for hydraulic fluid transfer from said pressure accumulator to said first chamber of said cylinder for raising the body relative to said running gear and a second plunger operated valve means to open and close exhaust port means to provide for hydraulic fluid transfer from said first chamber of said cylinder to said reservoir for lowering the body relative to said running gear, said height control valve including a rotatable member therein having a cam surface engageable with said plunger operated valves to operate the same upon rotation of said member to provide for admission of hydraulic fluid to said first chamber of said cylinder or exhaust of hydraulic fluid from said first chamber to adjust pressure in said cylinder in accordance with loading of the body, a spindle rotatably journaled in said height control valve and having linkage connected therewith and with said running gear to cause rotation of said spindle in response to a change in height relation between said body and said running gear, said spindle having driving connection with said rotatable member to rotate the same on rotation of said spindle whereby to open and close said plunger operated valves thereby, said motor vehicle having additional pump means operably connected with the running gear of the vehicle to produce liquid pressure when the running gear is in motion, and a fluid connection between said additional pump and said rotatable member to move the same relative to said plunger operated valve means to render the cam surface of the rotatable member ineffective for actuation of said plunger operated valve means so long as said additional pump means is producing liquid pressure as a result of motion of the vehicle wheel system.

References Cited in the file of this patent

UNITED STATES PATENTS

| | | |
|---|---|---|
| 1,585,833 | Down | May 25, 1926 |
| 2,490,311 | Rostu | Dec. 6, 1949 |
| 2,614,833 | Laugaudin | Oct. 21, 1952 |
| 2,621,924 | Panhard | Dec. 16, 1952 |
| 2,653,021 | Levy | Sept. 22, 1953 |
| 2,663,569 | Gouirand | Dec. 22, 1953 |
| 2,670,201 | Rossman | Feb. 23, 1954 |
| 2,687,311 | Nallinger | Aug. 24, 1954 |
| 2,757,376 | Brueder | July 31, 1956 |
| 2,820,647 | Jackson | Jan. 21, 1957 |